United States Patent
Sirohiwala et al.

(10) Patent No.: US 11,212,462 B1
(45) Date of Patent: Dec. 28, 2021

(54) CAMERA LENS TILT DETECTION AND CORRECTION

(71) Applicant: Apple Inc., Cupertino, CA (US)

(72) Inventors: Ali Husain Y. Sirohiwala, Santa Clara, CA (US); Andrew D. Fernandez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/551,474

(22) Filed: Aug. 26, 2019

Related U.S. Application Data

(60) Provisional application No. 62/734,882, filed on Sep. 21, 2018.

(51) Int. Cl.
| | | |
|---|---|---|
| *H04N 5/262* | (2006.01) | |
| *H04N 5/232* | (2006.01) | |
| *G03B 5/04* | (2021.01) | |
| *H04N 5/225* | (2006.01) | |

(52) U.S. Cl.
CPC ............ *H04N 5/2628* (2013.01); *G03B 5/04* (2013.01); *H04N 5/2254* (2013.01); *H04N 5/23212* (2013.01); *H04N 5/23287* (2013.01); *G03B 2205/0069* (2013.01)

(58) Field of Classification Search
CPC ............ H04N 5/2628; H04N 5/23287; H04N 5/2254; H04N 5/23212; G03B 5/04; G03B 2205/0069
See application file for complete search history.

(56) References Cited

U.S. PATENT DOCUMENTS

| | | |
|---|---|---|
| 8,767,120 B2 | 7/2014 | Takizawa |
| 8,903,230 B2 | 12/2014 | Shikama et al. |
| 9,179,067 B2 | 11/2015 | Takizawa |
| 9,210,306 B1 | 12/2015 | Gamadia et al. |
| 9,774,787 B2 | 9/2017 | Miller et al. |
| 10,063,752 B2* | 8/2018 | Topliss ................. H04N 5/2251 |
| 2011/0176046 A1* | 7/2011 | Hu ........................... G03B 3/10 |
| | | 348/335 |
| 2016/0014339 A1* | 1/2016 | Miller .................. H04N 5/2254 |
| | | 348/208.6 |
| 2016/0327806 A1* | 11/2016 | Kasamatsu ............. G02B 7/09 |
| 2017/0094183 A1 | 3/2017 | Miller et al. |
| 2018/0321459 A1* | 11/2018 | Kim ................... H04N 5/23212 |
| 2019/0020822 A1* | 1/2019 | Sharma ................ G02B 27/646 |

FOREIGN PATENT DOCUMENTS

JP         2012068339         4/2012

* cited by examiner

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

Methods and apparatus for detecting and correcting for lens tilt in cameras. The common mode signal may be derived from autofocus position (AP) sensors and used as a measure of the autofocus position of the lens on the Z axis. The differential mode signal may also be derived from the AP sensor signals. The differential mode signal may indicate that the lens is or is not tilted, and if tilted may indicate the direction and magnitude of the tilt. The differential mode signal may be used to apply a tilt correction transform to image data based on the strength and direction of the signal. The differential mode signal may also be used to translate the lens on an axis orthogonal to the Z axis to partially correct for lens tilt to align the image plane with the photosensor.

20 Claims, 11 Drawing Sheets

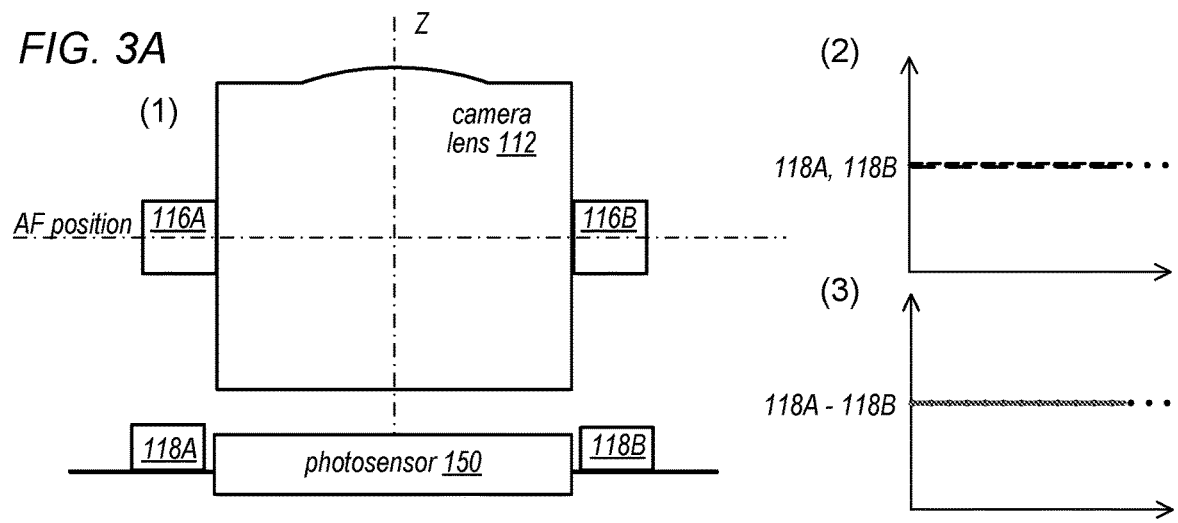
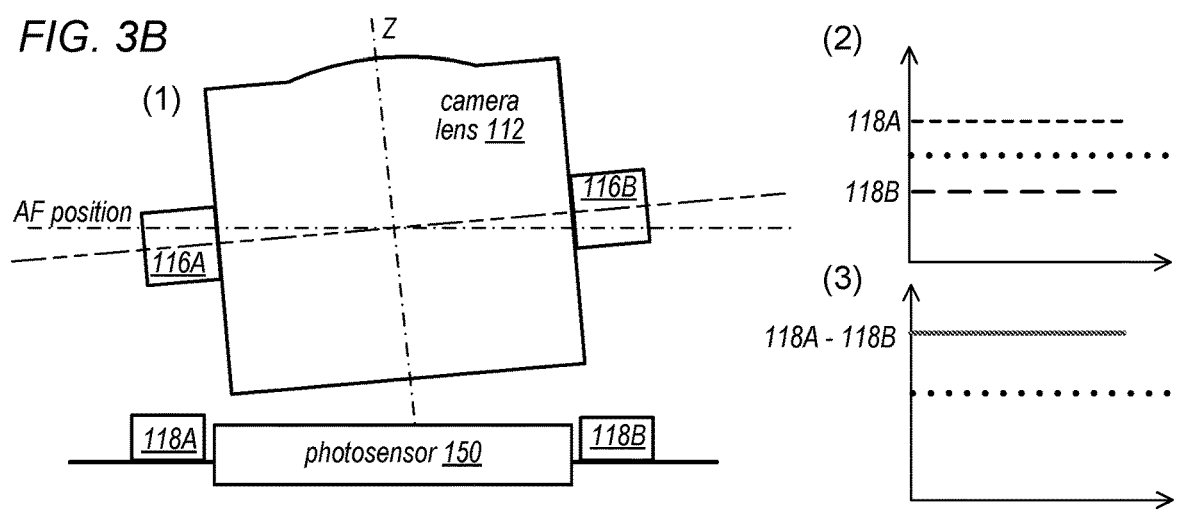
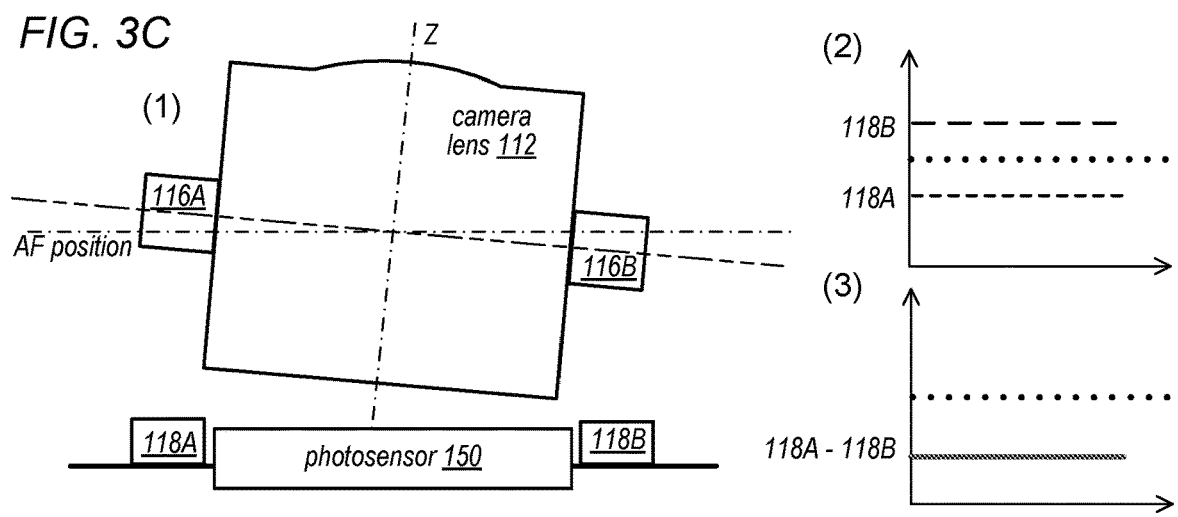

CAMERA LENS TILT DETECTION AND CORRECTION

PRIORITY INFORMATION

This application claims benefit of priority of U.S. Provisional Application Ser. No. 62/734,882 entitled "CAMERA LENS TILT DETECTION AND CORRECTION" filed Sep. 21, 2018, the content of which is incorporated by reference herein in its entirety.

BACKGROUND

Technical Field

This disclosure relates generally to camera systems, and more specifically to detecting and correcting for lens tilt.

Description of the Related Art

The advent of small, mobile multipurpose devices such as smartphones and tablet or pad devices has resulted in a need for high-resolution, small form factor cameras for integration in the devices. Such cameras may include an autofocus (AF) mechanism whereby the object focal distance can be adjusted to focus an object plane or field in front of the camera at an image plane to be captured by a photosensor. In some such autofocus mechanisms, the optical lens is moved as a single rigid body along the optical axis (referred to as the Z axis) of the camera to refocus the camera. The autofocus position may be measured using sensors, for example located on the camera module substrate along an axis of the lens. The common mode signal from the sensors is used as a measure of the autofocus position (i.e., the position of the optical lens on the Z axis).

SUMMARY OF EMBODIMENTS

Embodiments of the present disclosure may provide improved image quality for small format factor (SFF) cameras by detecting and correcting for lens tilt. SFF cameras may, for example, be used in mobile devices such as smartphones, cell phones, pad or tablet devices, and may also be used in other devices such as laptop or notebook computers. An example SFF camera system may include, but is not limited to, a lens system, a photosensor, and image processing software implemented by one or more processors. An SFF camera may also include an autofocus (AF) mechanism in which the optical lens is moved as a single rigid body by an actuator along the optical axis (referred to as the Z axis) of the camera to refocus the camera. Alternatively, in some cameras, the photosensor may be moved along the Z axis to refocus the camera. The autofocus position may be measured using sensors (referred to herein as autofocus position (AP) sensors), for example located on the camera module substrate along an axis of the lens, or alternatively located on the lens. The common mode signal derived from the AP sensor data is used as a measure of the autofocus position (i.e., the position of the optical lens on the Z axis with respect to the photosensor).

In embodiments, the differential mode signal may also be derived from the AP sensor data and leveraged to measure tilt between the photosensor plane and the lens. The tilt signal derived from the AP sensor information may, for example, be used during image processing to apply a tilt correction transform to image data based on the strength of the tilt signal recorded per frame. Thus, embodiments may use the AP sensor signals to derive both the AF position of the lens with respect to the photosensor and tilt of the lens with respect to the photosensor. Note that the tilt signal may indicate that the lens is or is not tilted, and if tilted may indicate the direction and magnitude of the tilt.

In some embodiments, the actuator may also provide optical image stabilization (OIS) functionality by translating the lens on the X and/or Y axis orthogonal to the Z axis. In these embodiments, the tilt signal derived from the AP sensor signals may be used to translate the lens on the X or Y axis to partially correct for lens tilt by shifting the image plane to align with the photosensor. The tilt correction transform may then be applied to further correct for lens tilt in the captured images.

BRIEF DESCRIPTION OF THE DRAWINGS

FIGS. 3A through 3C graphically illustrate deriving both the AF position of the lens with respect to the photosensor and tilt of the lens with respect to the photosensor from the AP sensor signal in a camera module, according to some embodiments.

Figure 1:
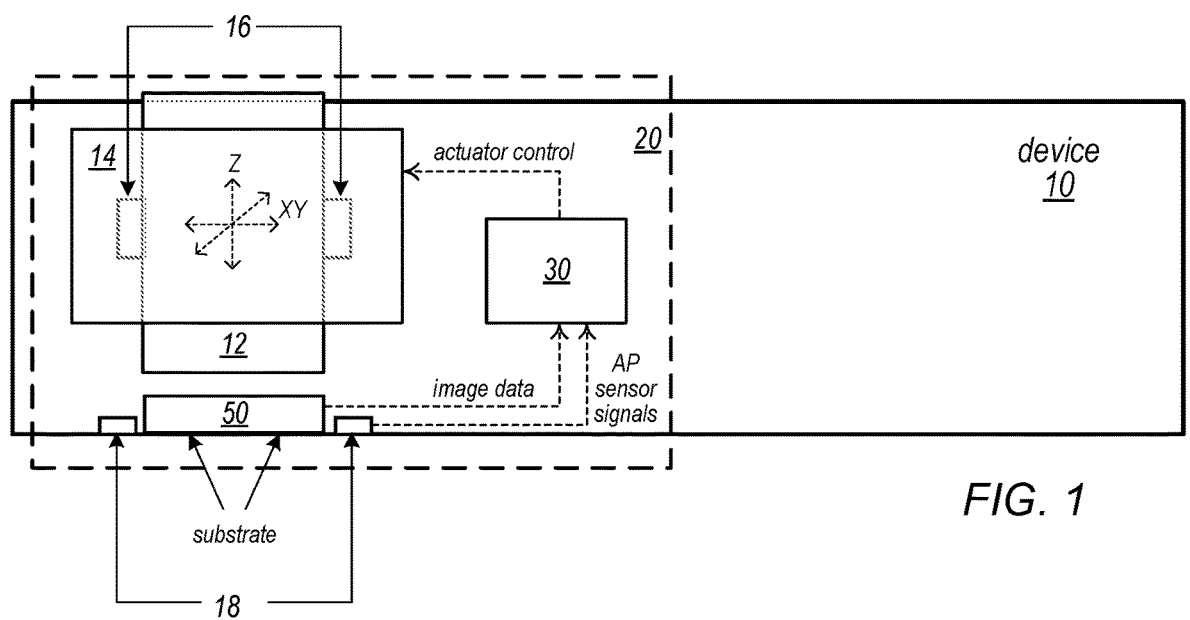
FIG. 1 is a cross-sectional diagram of an example device that includes a camera module with an autofocus (AF) mechanism, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of methods and apparatus for detecting and correcting for lens tilt in small format factor (SFF) cameras are described. An example SFF camera system may include, but is not limited to, a lens system, a photosensor, and image processing software implemented by one or more processors. An SFF camera may also include an autofocus (AF) mechanism in which the optical lens is moved by an actuator mechanism (e.g. a voice coil actuator (VCA) technology actuator) along the optical axis (referred to as the Z axis) of the camera system to refocus the camera. Alternatively, in some camera systems, the photosensor may be moved along the Z axis to refocus the camera. The autofocus position may be measured using sensors (referred to herein as autofocus position (AP) sensors), for example Hall effect sensors located on the camera module substrate along an axis of the lens, or alternatively located on the lens. The common mode signal derived from the AP sensor data is used as a measure of the autofocus position (i.e., the position of the optical lens on the Z axis with respect to the photosensor).

To form an optimal image plane at or near the surface of the camera's photosensor, the optical (Z) axis of the lens system should be orthogonal to the surface plane of the photosensor. However, the actuator mechanism may require the lens system to be suspended so that it can "float" in the camera assembly to allow freedom of movement on one or more axes. This may result in the lens system at least occasionally being tilted with respect to the photosensor. Lens tilt may be dynamic (e.g., caused by external forces) or static (e.g., due to manufacturing error, damage, or variations that may appear over time in the lens suspension system or actuator). If the lens system is tilted, the optical (Z) axis of the lens system is not orthogonal to the surface plane of the photosensor, and thus the image plane formed by the lens system will be tilted with respect to the surface of the photosensor. This tilt results in at least a portion of a captured image being out of focus.

In embodiments, the AP sensor data may be leveraged to detect and correct for tilt. In embodiments, the differential mode signal may also be derived from the AP sensor data and leveraged to measure tilt between the photosensor plane and the lens. The tilt signal derived from the AP sensor information may, for example, be used during image processing to apply a tilt correction transform to image data based on the strength of the tilt signal recorded per frame. Thus, embodiments may use the AP sensor signals to derive both the AF position of the lens with respect to the photosensor and tilt of the lens with respect to the photosensor. Note that the tilt signal may indicate that the lens is or is not tilted, and if tilted may indicate the direction and magnitude of the tilt.

In some embodiments, the actuator may also provide optical image stabilization (OIS) functionality by translating the lens on the X and/or Y axis orthogonal to the Z axis. In these embodiments, the tilt signal derived from the AP sensor signal may be used to translate the lens on the X or Y axis to partially correct for lens tilt by shifting the image plane to align with the photosensor. The tilt correction transform may then be applied to further correct for lens tilt in the captured images.

The size of an SFF camera is constrained by the dimensions (e.g., the thickness) of a device into which the camera is to be integrated. For example, some mobile devices such as smartphones, ultralight notebook computers, and pad devices may be just a few millimeters (e.g., 6-8 mm) thick, and an SFF camera for such a device is correspondingly sized, with total track length (TTL) of the camera lens (as defined form the object side surface of the camera lens to an image plane formed by the camera lens at the camera photosensor) being about or less than the thickness of the device. Note that TTL of a SFF camera may be increased by camera lens technologies such as "folding" the lens system using a reflective element within the lens stack such as a prism or mirror on the optical path, in which case the camera (Z) thickness may be defined by distance from the object side surface of the camera lens to the rear edge of the reflective element. However, SFF cameras may be correspondingly larger for mobile devices that are thicker, e.g. 8-20 mm. Thus, SFF cameras may in some instances include cameras of a size suitable for use in devices or applications that provide at most 20 mm of thickness for the camera. However, note that the camera technologies and methods as described herein may be used for larger cameras and for different applications. Also note that, while embodiments of an SFF camera system are primarily described for use in mobile multipurpose devices such as smartphones and pad devices, embodiments may be used in any of a variety of devices, or even as standalone cameras.

FIG. 1 is a cross-sectional diagram of an example device 10 that includes a camera module 20 with an autofocus (AF) mechanism in which the methods and apparatus for detecting and correcting for lens tilt may be implemented. An SSF camera module 20 may include, but is not limited to, a photosensor 50, a camera lens 12, a camera application 30 implemented by one or more processors, and an actuator 14. The camera lens 12 may include one or more refractive lens elements, which collectively may be referred to as a lens stack, lens barrel, or master lens, and may also include other elements such as an infrared (IR) filter and aperture stop.

The actuator 14 may be configured to mechanically adjust the camera lens 12 with respect to the photosensor 50 on one or more axes under control of the camera application 30. For example, the actuator 14 may provide autofocus (AF) functionality that, under control of the camera application 30, may be used to shift the camera lens 12 up or down on the optical (Z) axis. The actuator 14 may, for example, include a voice coil actuator (VCA) mechanism. The camera lens 12 may also include two or more magnets 16, for example two magnets 16 diametrically attached to opposite sides of the camera lens 12. The magnets 16 may be, but are not necessarily, components of the actuator 14 mechanism. The camera module 20 may also include two or more autofocus position (AP) sensors 18, for example two Hall effect sensors 18, located on the camera module 20 substrate below magnets 16 on lens 12 on opposite sides of the photosensor 50. Note that, in some embodiments, the sensors 18 may be attached to the lens 20, and the magnets 16 may be located on the camera module 20 substrate.

AP sensors 18 may output signals based on the magnetic field of respective magnets 16. Each AP sensor 18's signal varies based on distance to a respective magnet 16. For example, in some embodiments, Hall effect sensors may be used; a Hall effect sensor is a transducer that varies its output voltage in response to a magnetic field. The AP sensor 18 signals are input to the camera application 30 and used by the camera application 30 to determine current AF position of the lens 12 with respect to the photosensor 50 and to control the actuator 14 to achieve a desired AF position. For example, in an embodiment where two AP sensors 18 are used, the voltage output from the two AP sensors 18 may indicate current AF position of the lens 12 with respect to the photosensor 50. The camera application 30 may control the actuator 14 to achieve a desired AF position using the common mode signal of the voltage output from the two sensors 18 as feedback.

In some embodiments, the actuator 14 may also provide optical image stabilization (OIS) functionality that, under control of the camera application 30, may be used to shift the optical axis on one or more axes (referred to as X and Y axes) orthogonal to the optical (Z) axis of the camera lens 12.

Figure 2:
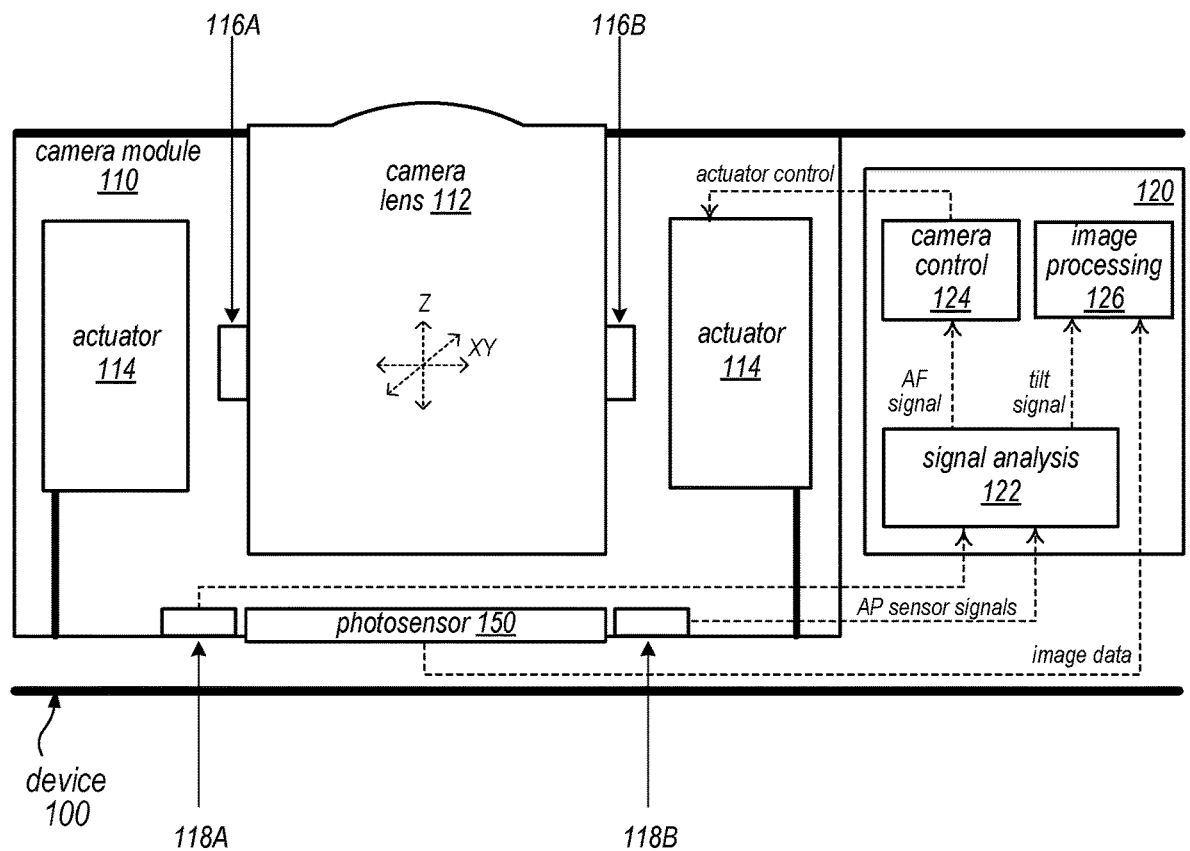
FIG. 2 illustrates an example camera module in which the signal from autofocus position (AP) sensors is used to derive both the AF position of the lens with respect to the photosensor and tilt of the lens with respect to the photosensor, according to some embodiments.

FIG. 2 illustrates an example camera module in which the signal from autofocus position (AP) sensors is used to derive both the AF position of the lens with respect to the photosensor and tilt of the lens with respect to the photosensor, according to some embodiments. FIG. 2 illustrates an example mechanical actuator that mechanically adjusts the camera lens of a small form factor camera. To achieve autofocus (AF) and/or optical image stabilization (OIS) functionality in small form factor cameras, a mechanical solution such as VCA (voice coil actuator) technology that moves the lens module in relation to the image plane in the Z (optical axis) direction for AF and translating the lens module in the X and Y (orthogonal to the Z axis) directions for OIS may be used. FIG. 2 illustrates motion of a camera lens 112 under control of an example mechanical actuator component 114 that provides mechanical autofocus (AF) and/or optical image stabilization (OIS) functionality for a camera module 110. The actuator component 114 may, for example, include a voice coil actuator (VCA) mechanism. The actuator component 114 may, for example, be mounted to a substrate that includes a photosensor 150 of the camera. The actuator component 114 may provide motion to camera lens 112 on the Z (optical) axis and/or in the XY plane. The XY plane motion may, for example, provide optical image stabilization (OIS) by moving the camera lens 112 on the X and/or Y axis relative to the photosensor 150. The Z axis motion may, for example, provide optical focusing or autofocus for the camera by moving the camera lens 112 on the Z axis relative to the photosensor 150.

FIG. 2 illustrates components of an example SFF camera system in a device 100 that provides X, Y and Z motions for the camera lens 112 via a mechanical actuator component 114 that may be used to detect and correct for lens tilt, according to some embodiments. In this example, the SFF camera system may include a camera module 110 integrated into a device 100, with the camera module 110 including a camera lens 112 that is coupled to an actuator component 114, for example by upper and/or lower springs. The camera lens 112 may include a lens barrel that includes a stack of lens elements. The actuator component 114 may, for example, include magnets used in a VCM actuator mechanism. The springs may be flexible to allow motion of the camera lens 112 on the Z axis relative to a photosensor 150 within the camera module 110. The actuator component 114 may be configured to move the camera lens 112 on the Z axis within the camera module 110 and relative to the photosensor 150, for example to provide focusing or autofocus for the camera. An assembly which includes at least the camera lens 112, actuator component 114, and springs may be suspended within the camera module 110 on two or more suspension wires. For example, the suspension wires may be mounted to a base of the camera module 110 in the device 100, and the assembly may be suspended on the wires at the outer portion of the upper springs. The suspension wires may be flexible to allow motion of the assembly, and thus of the camera lens 112, on the XY axes orthogonal to the Z (optical) axis of the camera lens 112. The actuator component 114 may be configured to move the camera lens 112 on the XY axes within the camera module 110 and relative to the photosensor 150, for example to provide optical image stabilization (OIS) for the camera. A cover for the assembly may be attached to the base of the camera module 110. The assembled camera module 110 may, for example, be mounted to a substrate in device 100 that includes a photosensor 150 for the camera.

The camera module 110 and/or device 100 may include one or more processors 120 that implement camera control 124, signal analysis 122, and image processing 126 modules (collectively referred to as a camera application) of the SFF camera system.

The camera lens 112 may include two magnets 116A and 116B diametrically attached to opposite sides of the camera lens 112. The magnets 116 may be, but are not necessarily, components of the actuator 114 mechanism. The camera module 110 may also include two autofocus position (AP) sensors 118A and 118B, for example two Hall effect sensors 118, located on the camera module 110 substrate below magnets 116A and 116B, respectively, and on opposite sides of the photosensor 150. Note that, in some embodiments, the AP sensors 118A and 118B may be attached to the lens 112, and the magnets 116A and 116B may be located on the camera module 110 substrate.

AP sensors 118A and 118B may each output signals based on the magnetic field of respective magnets 116A and 116B. Each AP sensor 118's signal varies based on distance to a respective magnet 116. The AP sensor 118A and 118B signals are input to the signal analysis 122 that determines a current AF position of the lens 112 with respect to the photosensor 150 based on the AP sensor 118A and 118B signals. For example, the common mode signal of the voltage output from the two AP sensors 118 may be determined to indicate the current AF position of the lens 112 with respect to the photosensor 150. The current AF position (AF signal) is output to camera control 124. Camera control 124 signals the actuator 114 to move the camera lens 112 on the Z axis to achieve a desired AF position using the AF signal derived from the two AP sensor signals as feedback.

Figure 3D:
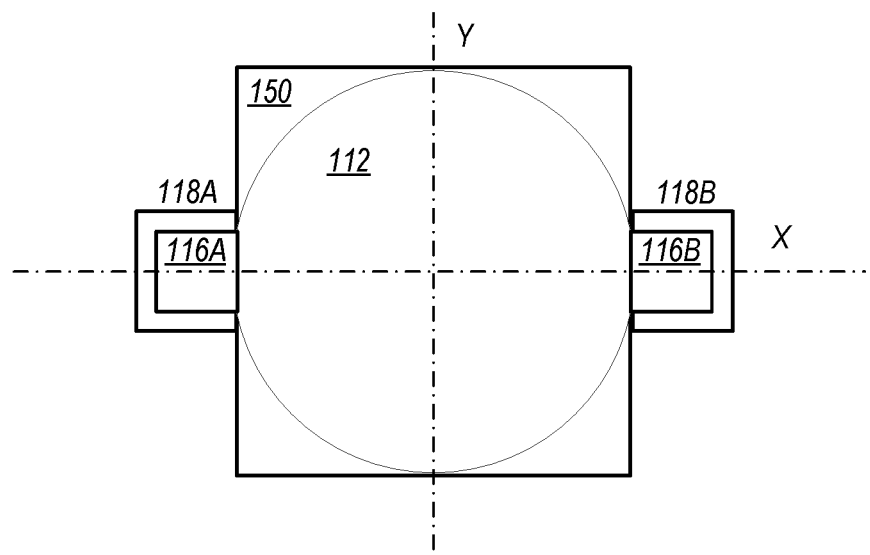
FIG. 3D is a top view of a camera module as shown in FIGS. 3A through 3C, and shows that using two AP sensors and two magnets allows tilt to be detected for one axis.

To form an optimal image plane at or near the surface of photosensor 150, the optical (Z) axis of the camera lens 112 should be orthogonal to the surface plane of the photosensor 150, as shown in FIG. 3A. However, the actuator 114 mechanism requires the camera lens 112 to be suspended so that it can "float" to allow freedom of movement on one or more axes. This may result in the camera lens 112 at least occasionally being tilted with respect to the photosensor 150 as shown in FIG. 3A or FIG. 3B, for example due to external forces, manufacturing error, damage, or variations that may appear over time in the lens suspension system or actuator 114. If the camera lens 112 is tilted, the optical (Z) axis of the camera lens 112 is not orthogonal to the surface plane of the photosensor, and thus the image plane formed by the camera lens 112 will be tilted with respect to the surface of the photosensor 150. This tilt results in at least a portion of a captured image being out of focus.

As mentioned above, the AP sensor 118A and 118B signals are input to signal analysis 122 that determines the common mode signal from the two AP sensor signals that is used to indicate a current AF position of the lens 112 with respect to the photosensor 150. In embodiments, signal analysis 122 may also determine the differential mode signal (referred to as the tilt signal) from the two AP sensor signals as a measure of tilt between the photosensor 150 surface plane and the camera lens 112 Z axis. The tilt signal derived from the AP sensor signals may be passed to image processing 126 (e.g., an image signal processor (ISP)) and used during image processing to apply a tilt correction transform to image data based on the strength of the tilt signal recorded per frame. Thus, embodiments may use the AP sensor signals to derive both the AF position of the lens with respect to the photosensor and tilt of the lens with respect to the photosensor. Note that the tilt signal may indicate that the lens is or is not tilted, and if tilted may indicate the direction and magnitude of the tilt.

FIGS. 3A through 3C graphically illustrate deriving both the AF position of the lens with respect to the photosensor and tilt of the lens with respect to the photosensor from the AP sensor signal in a camera module as illustrated in FIG. 2, according to some embodiments. FIGS. 3A (1), 3B (1), and 3C (1) show a camera lens 112 at the same AF position. The camera lens 112 may include two magnets 116A and 116B diametrically attached to opposite sides of the camera lens 112. The camera module 110 may also include two autofocus position (AP) sensors 118A and 118B, for example two Hall effect sensors 118, located on the camera module 110 substrate below magnets 116A and 116B, respectively, and on opposite sides of the photosensor 150. Note that, in some embodiments, the sensors 118A and 118B may be attached to the lens 112, and the magnets 116A and 116B may be located on the camera module 110 substrate.

FIG. 3A (1) shows the camera lens 112 with no tilt. The Z axis of the camera lens 112 is orthogonal to the surface plane of the photosensor 150. FIG. 3B (1) shows the camera lens 112 tilted to the left. The Z axis of the camera lens 112 is tilted to the left with respect to the surface plane of the photosensor 150. FIG. 3C (1) shows the camera lens 112 tilted to the right. The Z axis of the camera lens 112 is tilted to the right with respect to the surface plane of the photosensor 150.

FIGS. 3A (2), 3B (2), and 3C (2) are graphs showing the common mode signal derived from the two AP sensor signals of FIGS. 3A (1), 3B (1), and 3C (1), respectively. FIGS. 3A (3), 3B (3), and 3C (3) are graphs showing the differential mode signal derived from the two AP sensor signals of FIGS. 3A (1), 3B (1), and 3C (1), respectively. As shown in the Legend for FIGS. 3A through 3C, the AP signal of sensor 118A is represented by a short dash line, the AP signal of sensor 118B is represented by a long dash line, the common mode signal is represented by a dotted line, and the differential mode signal is represented by a solid gray line. The common mode signal (also referred to as the AF signal) indicates the autofocus (Z-axis) position of the camera lens 112. The differential mode signal (also referred to as the tilt signal) is proportional to tilt of the camera lens 112. The common mode signal may be derived as the average of the two AP sensor signals. The differential mode signal may also be derived the two AP sensor signals. In this example, the differential mode signal is:

Sensor 118A AP signal−Sensor 118B AP signal

The magnitude of the differential mode signal indicates the degree of tilt. The sign (positive or negative) of the differential mode signal indicates the direction of tilt.

FIGS. 3A (2) and (3) show that, with no lens tilt, the common mode signal and the differential mode signal are the same. FIG. 3B (2) shows that, when lens 112 is tilted to the left, the common mode signal is the same as in FIG. 3A (2). However, as shown in FIG. 3B (3), the differential mode signal is higher than the common mode signal, indicating tilt to the left. FIG. 3C (2) shows that, when lens 112 is tilted to the right, the common mode signal is the same as in FIGS. 3A (2) and 3B (2). However, as shown in FIG. 3C (3), the differential mode signal is lower than the common mode signal, indicating tilt to the right.

Figure 3E:
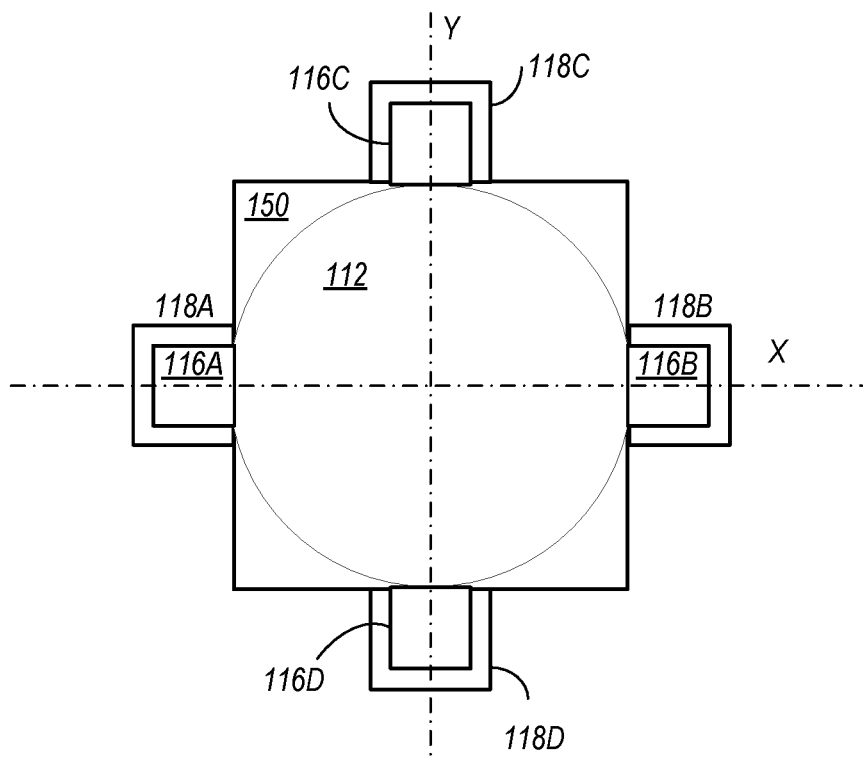
FIG. 3E is a top view of a camera module that includes more than two sensors and more than two magnets in which signals from the AP sensors can be used to detect tilt for more than one axis.

For simplicity, the example camera module 110 illustrated in FIGS. 2 and 3A-3C includes two AP sensors 118A and 118B and two magnets 116A and 116B. As illustrated in a top view of camera module 110 shown in FIG. 3D, this example embodiment may allow tilt of the lens 112 with respect to the sensor 150 to be detected only for an axis that passes through magnets 118A and 118B. For illustrative purposes, FIG. 3D shows two axes X and Y of lens 112 that are orthogonal to the Z axis, with the X axis passing through magnets 118A and 118B; the example embodiment shown in FIG. 3D may only allow tilt of the X axis to be detected. Thus, in some embodiments, more than two sensors 118 and/or more than two magnets 116 may be included and signals from the sensors 118 may be used to detect tilt for more than one axis. FIG. 3E shows an example embodiment that includes four magnets 116A-116D and four sensors 116A-116D. Signals from sensors 116A and 116B may allow tilt of the X axis to be detected, and signals from sensors 116C and 116D may allow tilt of the Y axis to be detected.

Figure 4:
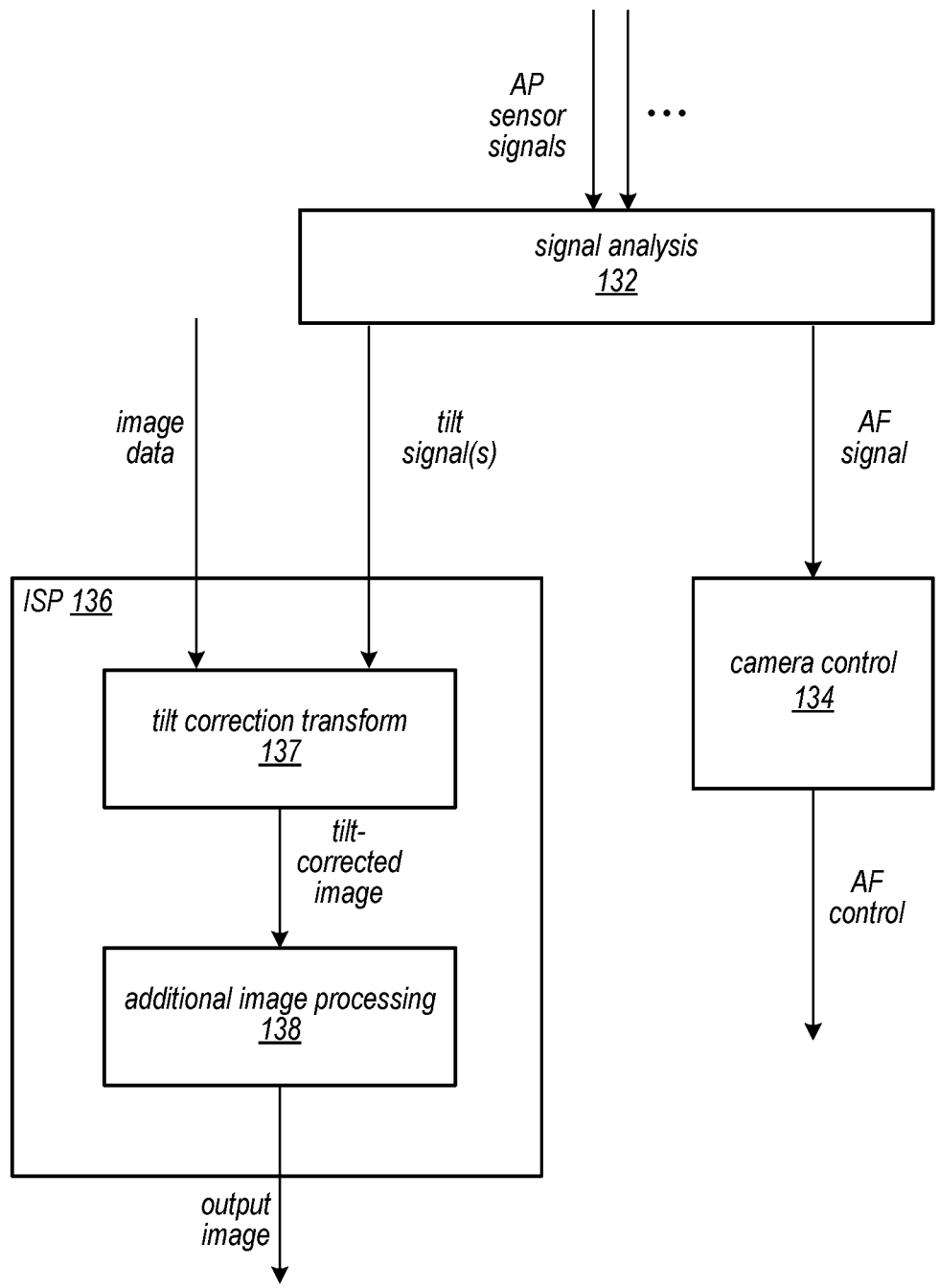
FIG. 4 illustrates deriving tilt of the lens with respect to the photosensor from the AP sensor signal and applying the tilt signal to correct for lens tilt in images during image processing, according to some embodiments.

FIG. 4 illustrates deriving tilt of the lens with respect to the photosensor from the AP sensor signal and applying the tilt signal to correct for lens tilt in images during image processing, according to some embodiments. Signal analysis 132 receives AP sensor signals from two or more AP sensors. Signal analysis 132 derives the AF signal from the AP sensor signals and provides the AF signal as feedback to camera control 134. Camera control 124 signals the actuator to move the camera lens on the Z axis to achieve a desired AF position using the AF signal derived from the two AP sensor signals as feedback. Signal analysis 132 also derives tilt signal(s) from the AP sensor signals and provides the tilt signal(s) to ISP 136. ISP 136 applies a tilt correction transform 137 to image data received from the photosensor as necessary according to the tilt signal(s). Note that the tilt signal(s) may indicate that the lens is or is not tilted, and if tilted may indicate the direction and magnitude of the tilt. Additional image processing 138 may be applied to the image data.

In some embodiments, the actuator may also provide optical image stabilization (OIS) functionality by translating the lens on the X and/or Y axis orthogonal to the Z axis. In these embodiments, the tilt signal derived from the AP sensor signals may be used to translate the lens on the X or Y axis to partially correct for lens tilt by shifting the image plane to align with the photosensor. The tilt correction transform may then be applied to further correct for lens tilt in the captured images.

Figure 5A:
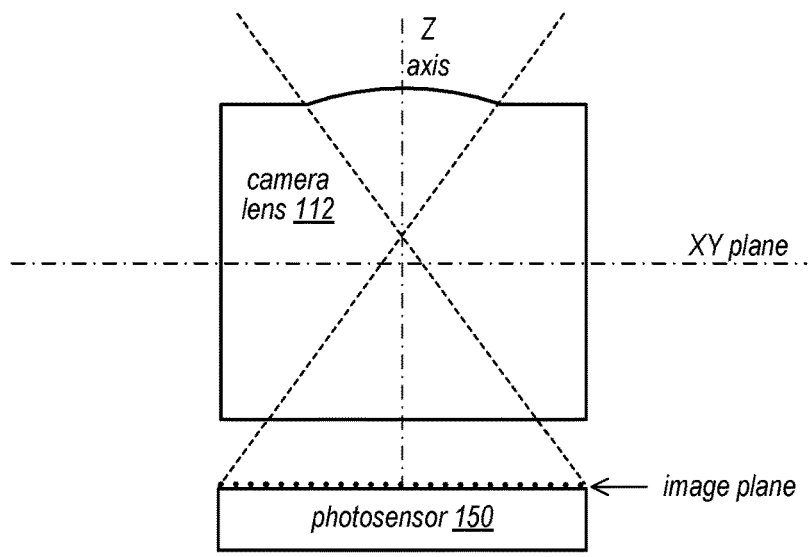
FIGS. 5A through 5C illustrate translating the lens on the XY plane to partially correct for lens tilt in response to the tilt signal derived from the AP sensor signals, according to some embodiments.
Figure 5B:
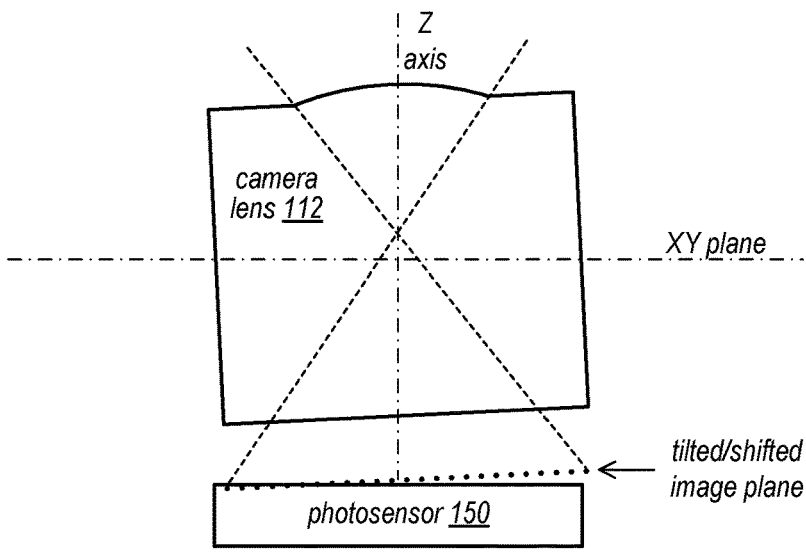
Figure 5C:
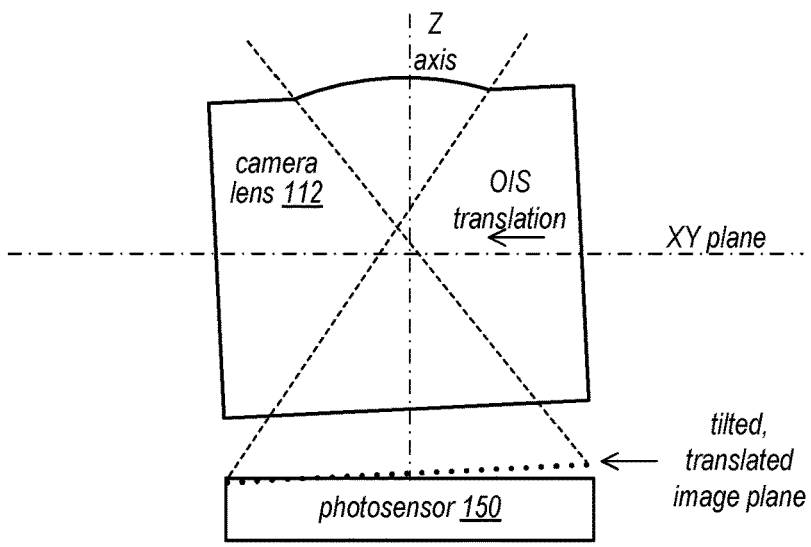

FIGS. 5A through 5C illustrate translating the lens on the XY plane to partially correct for lens tilt in response to the tilt signal derived from the AP sensor signals, according to some embodiments. As shown in FIG. 5A, when camera lens 112 is not tilted, the Z axis is orthogonal to the photosensor 150 and thus the image plane is aligned with the photosensor 150 surface. As shown in FIG. 5B, when camera lens 112 is tilted, the Z axis is not orthogonal to the surface of the photosensor 150, and the image plane is tilted and shifted with respect to the photosensor 150 surface. In embodiments, the tilt signal derived from the AP sensor signals may indicate the magnitude and direction of tilt. The tilt signal may be provided to the camera control module (not shown), which may then direct the actuator (not shown) to translate the lens on the XY plane to shift the image plane to align with the photosensor 150 as shown in FIG. 5C. The tilt signal may also be provided to an ISP which applies a tilt correction transform to the image data.

Figure 6A:
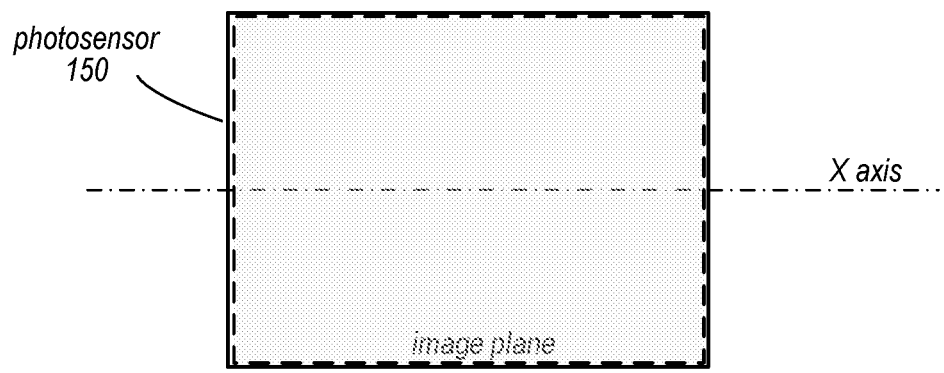
FIGS. 6A through 6C graphically illustrate shifting the image plane to partially correct for lens tilt in response to the tilt signal derived from the AP sensor signals, according to some embodiments.
Figure 6B:
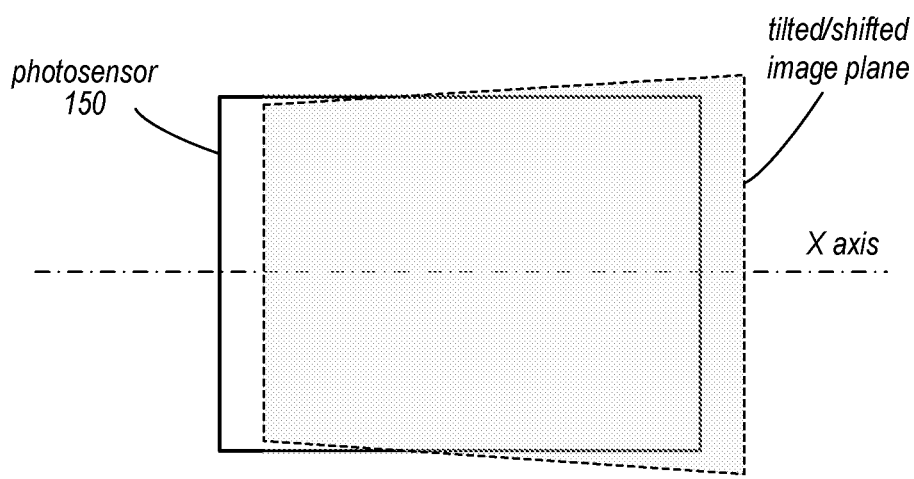
Figure 6C:
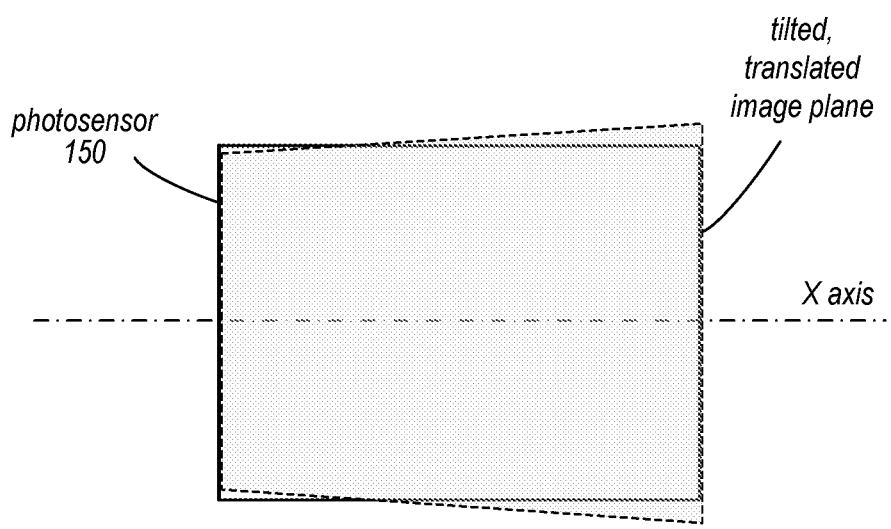

FIGS. 6A through 6C graphically illustrate shifting the image plane to partially correct for lens tilt in response to the tilt signal derived from the AP sensor signals, according to some embodiments. As shown in FIG. 6A, when the camera lens is not tilted, the image plane is aligned with the photosensor 150 surface. As shown in FIG. 6B, when the camera lens is tilted, the image plane is tilted and shifted with respect to the photosensor 150 surface. In embodiments, the tilt signal derived from the AP sensor signals may indicate the magnitude and direction of tilt. The tilt signal may be provided to the camera control module, which may then direct the actuator to translate the lens on the XY plane to shift the image plane to align with the photosensor 150 as shown in FIG. 6C. The tilt signal may also be provided to the ISP which applies a tilt correction transform to the image data.

Figure 7:
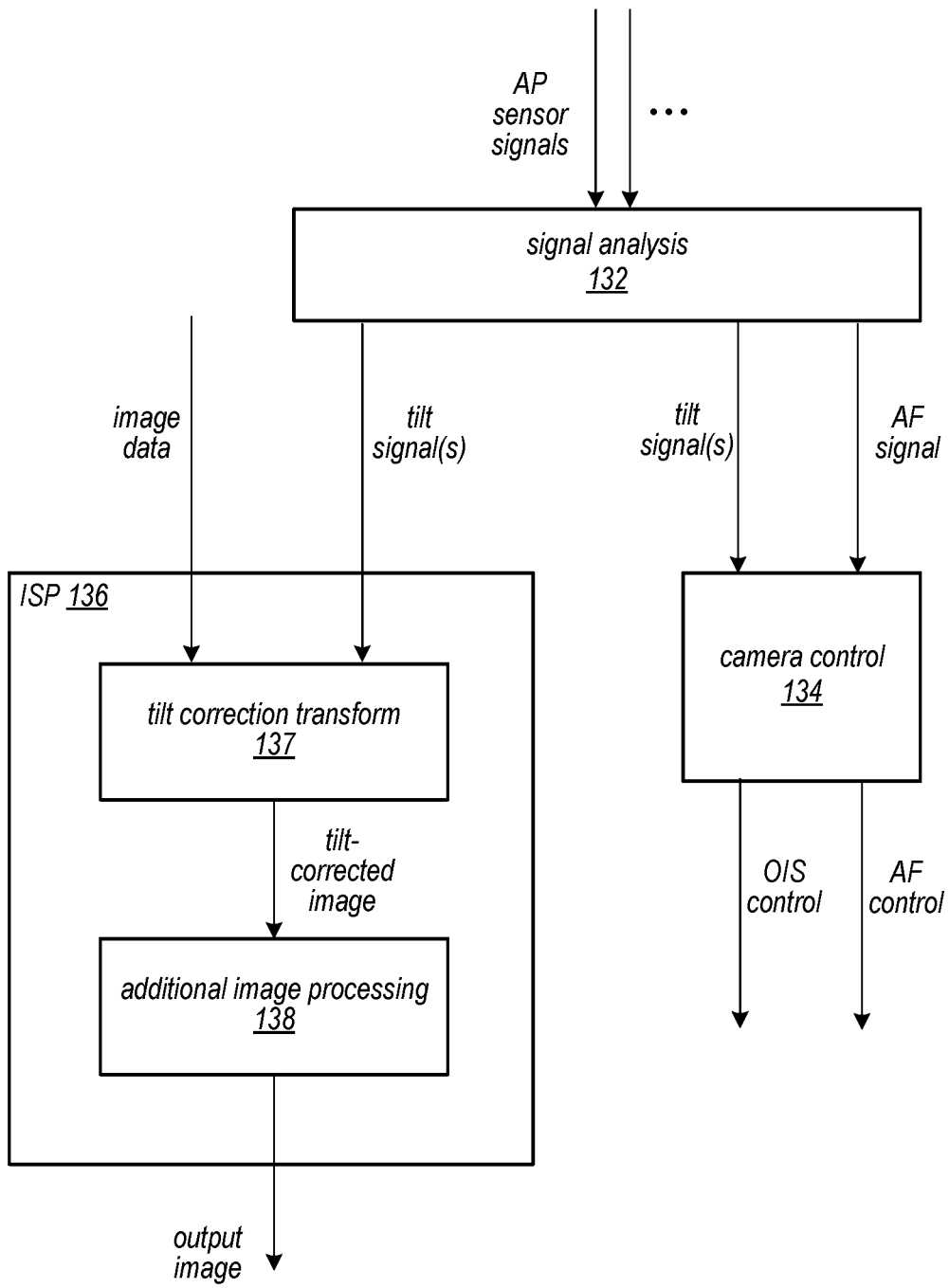
FIG. 7 illustrates applying the tilt signal to translate the lens on the XY plane to partially correct for lens tilt and applying the tilt signal to further correct for lens tilt in images during image processing, according to some embodiments.

FIG. 7 illustrates applying the tilt signal(s) to translate the lens on the XY plane to partially correct for lens tilt and applying the tilt signal(s) to further correct for lens tilt in images during image processing, according to some embodiments. Signal analysis 132 receives AP sensor signals from two or more AP sensors. Signal analysis 132 derives the AF signal from the AP sensor signals and provides the AF signal as feedback to camera control 134. Camera control 124 signals the actuator to move the camera lens on the Z axis to achieve a desired AF position using the AF signal as feedback. Signal analysis 132 also derives tilt signal(s) from the AP sensor signals and provides the tilt signal(s) to camera control 124. Camera control 124 signals the actuator to translate the camera lens on the XY plane to align the image plane with the photosensor. Signal analysis 132 also provides the tilt signal(s) to ISP 136. ISP 136 applies a tilt correction transform 137 to image data received from the photosensor as necessary according to the tilt signal(s). Note that the tilt signal(s0 may indicate that the lens is or is not tilted, and if tilted may indicate the direction and magnitude of the tilt. Additional image processing 138 may be applied to the image data.

Figure 8:
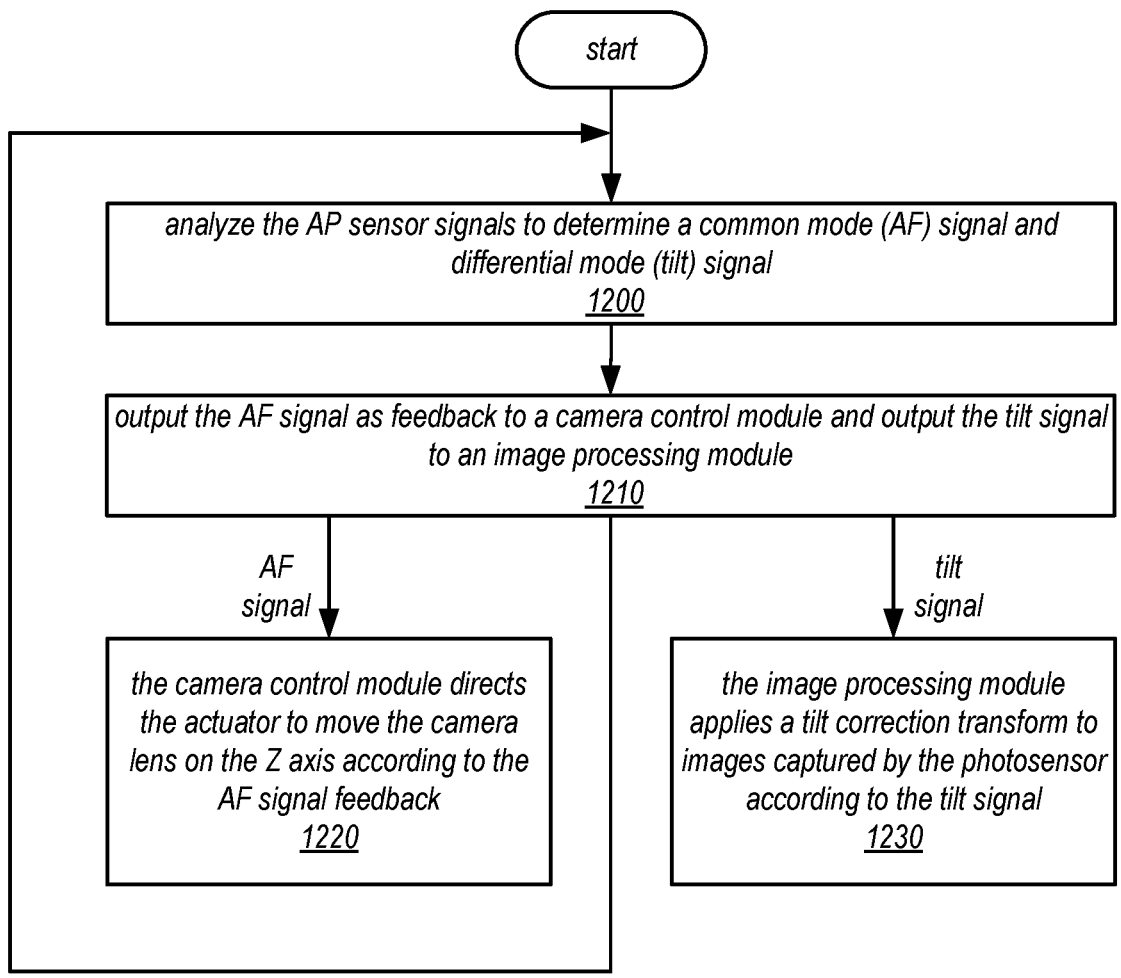
FIG. 8 is a flowchart of a method for deriving both the AF position of the lens with respect to the photosensor and tilt of the lens with respect to the photosensor from the AP sensor signal and applying the tilt signal to correct for lens tilt in images during image processing, according to some embodiments.
Figure 9:
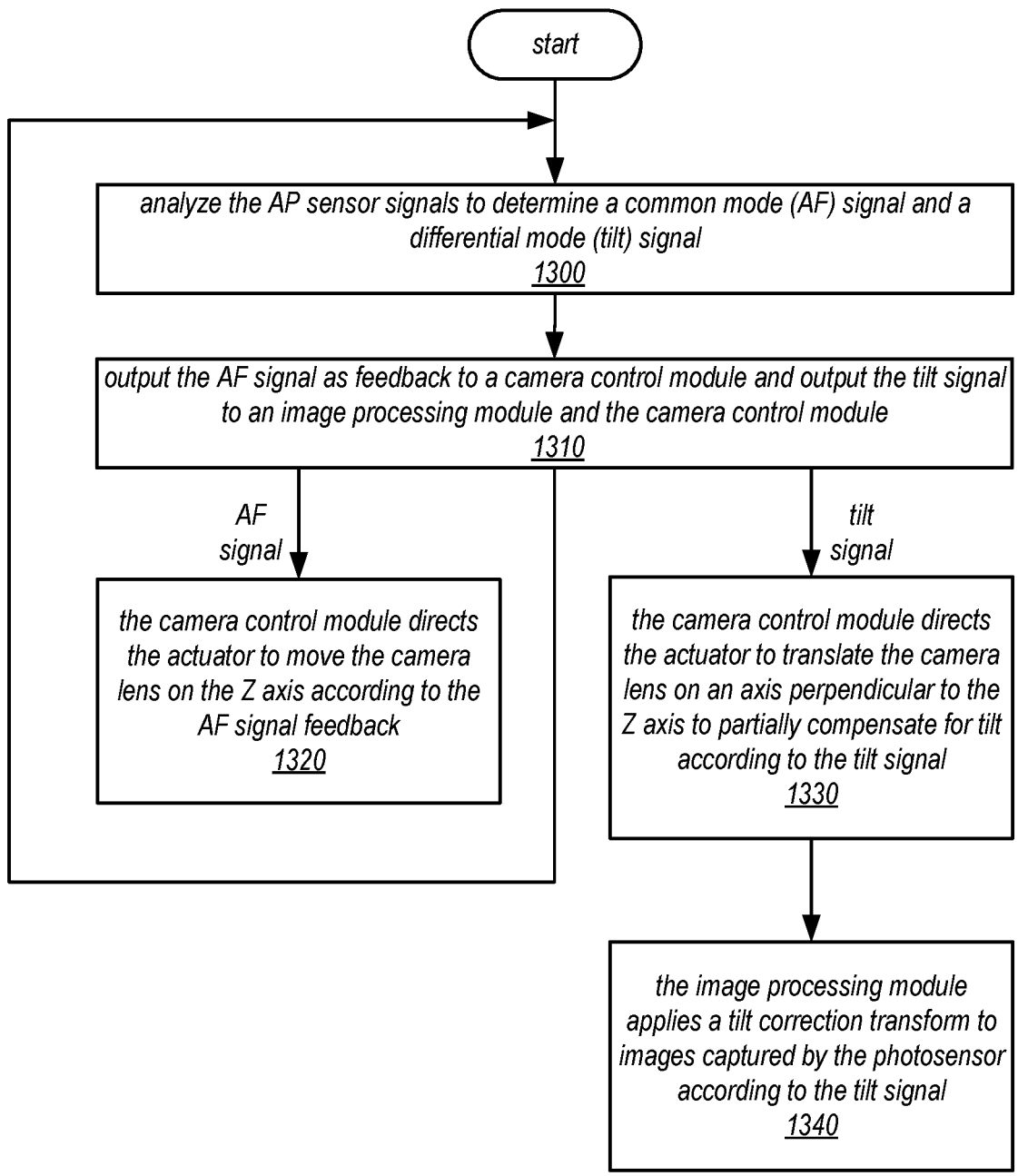
FIG. 9 is a flowchart of a method for deriving both the AF position of the lens with respect to the photosensor and tilt of the lens with respect to the photosensor from the AP sensor signal, applying the tilt signal to translate the lens on the XY plane to partially correct for lens tilt, and applying the tilt signal to further correct for lens tilt in images during image processing, according to some embodiments.

FIGS. 8 and 9 are flowcharts of methods that may be implemented in SFF camera systems to detect and correct for lens tilt, according to some embodiments.

FIG. 8 is a high-level flowchart of a method for deriving both the AF position of the lens with respect to the photosensor and tilt of the lens with respect to the photosensor from the AP sensor signal and applying the tilt signal to correct for lens tilt in images during image processing, according to some embodiments. As indicated at 1200, the AP sensor signals are analyzed to determine a common mode (AF) signal that indicates autofocus position of the camera lens and a differential mode (tilt) signal that indicates tilt (direction and magnitude) of the camera lens, if present. As indicated at 1210, the AF signal is output as feedback to a camera control module, and the tilt signal is output to an image processing module (e.g., an ISP). As indicated at 1220, the camera control module directs the actuator to move the camera lens on the Z axis according to the AF signal feedback. As indicated at 1230, the image processing module applies a tilt correction transform to images captured by the photosensor according to the tilt signal.

The arrow leading back from 1210 to 1200 indicates that the method is a feedback/optimization algorithm that adjusts the autofocus position of the camera lens while detecting and correcting for lens tilt as necessary when capturing one or more images with the camera.

In some embodiments, the actuator may also provide optical image stabilization (OIS) functionality by translating the lens on the X and/or Y axis orthogonal to the Z axis. In these embodiments, the tilt signal derived from the AP sensor signals may be used to translate the lens on the X or Y axis to partially correct for lens tilt by shifting the image plane to align with the photosensor. The tilt correction transform may then be applied to further correct for lens tilt in the captured images.

FIG. 9 is a flowchart of a method for deriving both the AF position of the lens with respect to the photosensor and tilt of the lens with respect to the photosensor from the AP sensor signal, applying the tilt signal to translate the lens on the XY plane to partially correct for lens tilt, and applying the tilt signal to further correct for lens tilt in images during image processing, according to some embodiments. As indicated at 1300, the AP sensor signals are analyzed to determine a common mode (AF) signal that indicates autofocus position of the camera lens and a differential mode (tilt) signal that indicates tilt (direction and magnitude) of the camera lens, if present. As indicated at 1310, the AF signal is output as feedback to a camera control module, and the tilt signal is output to an image processing module (e.g., an ISP) and the camera control module. As indicated at 1320, the camera control module directs the actuator to move the camera lens on the Z axis according to the AF signal feedback. As indicated at 1330, the camera control module directs the actuator to translate the camera lens on an axis perpendicular to the Z axis to partially compensate for tilt according to the tilt signal. As indicated at 1340, the image processing module applies a tilt correction transform to images captured by the photosensor according to the tilt signal.

The arrow leading back from 1310 to 1300 indicates that the method is a feedback/optimization algorithm that adjusts the autofocus position of the camera lens while detecting and correcting for lens tilt as necessary when capturing one or more images with the camera.

While embodiments are generally described herein in relation to small form factor cameras, embodiments may be used in any camera that includes a similar autofocus position (AP) sensor mechanism to detect and correct for lens tilt based on the signals from the AP sensors. Further, while embodiments are generally described herein that include two magnets and two AP sensors, embodiments may be applied in cameras that include more than two magnets and more than two AP sensors to detect and correct for lens tilt based on the signals from the AP sensors.

Example Computing Device

Figure 10:
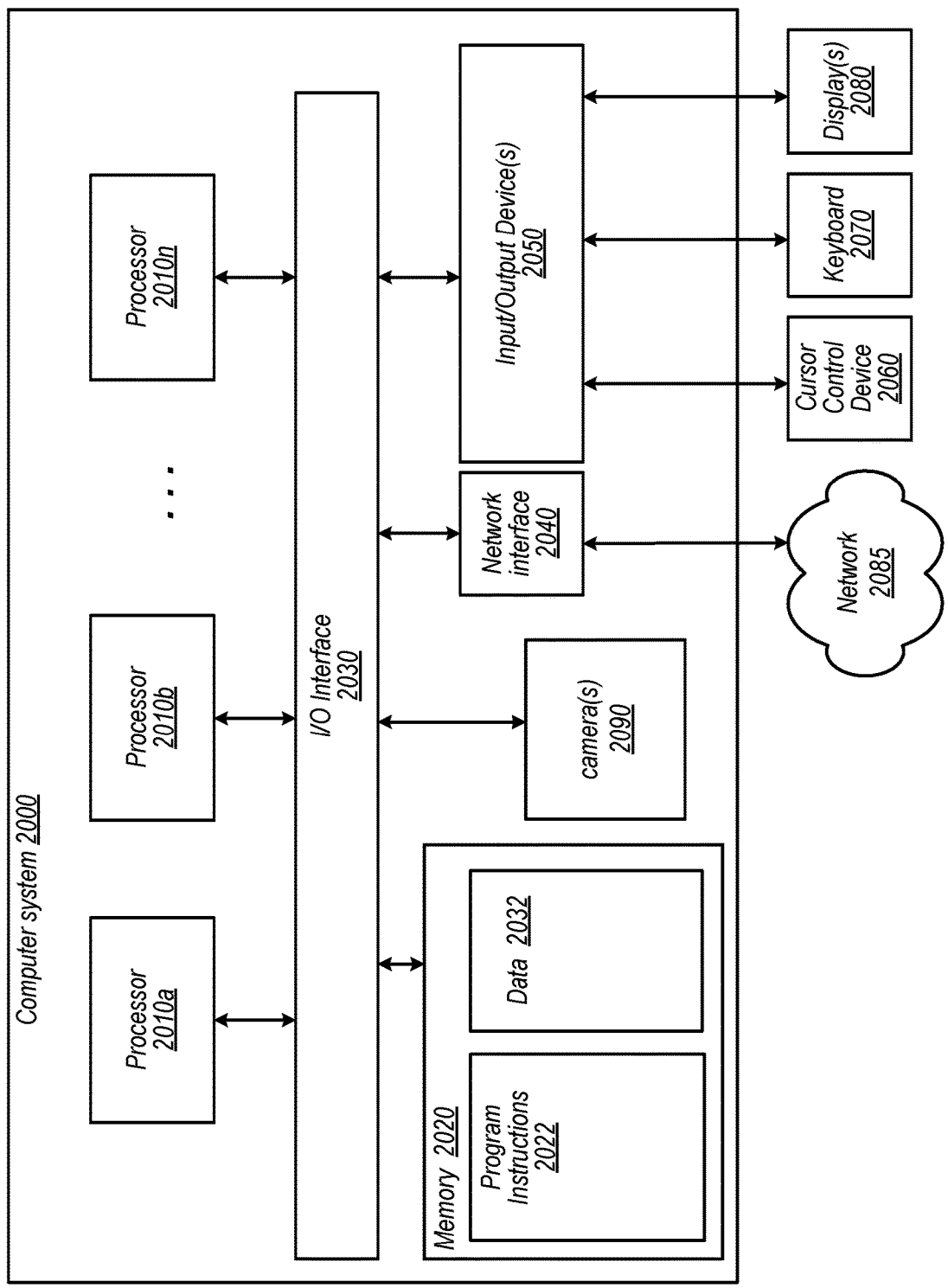
FIG. 10 illustrates an example computer system that may be used in embodiments.

FIG. 10 illustrates an example computing device, referred to as computer system 2000, that may include or host embodiments of an SFF camera system as illustrated in FIGS. 1 through 9. In addition, computer system 2000 may implement methods for controlling operations of the camera, for analyzing image data captured with the camera, and/or for performing image processing of images captured with the camera. In different embodiments, computer system 2000 may be any of various types of devices, including, but not limited to, a personal computer system, desktop computer, laptop, notebook, tablet or pad device, slate, or netbook computer, handheld computer, workstation, network computer, a camera, a set top box, a mobile device, a wireless phone, a smartphone, a consumer device, video game console, handheld video game device, a video recording device, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more SFF cameras as described above with respect to FIGS. 1 through 9, which may also be coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 10, memory 2020 may include program instructions 2022, which may be processor-executable to implement any element or action to support integrated camera 2090, including but not limited to image processing software, and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, solid-state or flash memory media such as USB flash drives, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   a camera comprising a photosensor and a camera lens, wherein the camera includes an actuator configured to adjust focus position of the camera lens with respect to the photosensor along an optical (Z) axis of the camera lens;
   two or more magnets; and
   two or more sensors, wherein each of the two or more sensors is configured to generate a signal indicating distance from a respective one of the two or more magnets;
   one or more processors configured to:
      receive the signals from the two or more sensors;
      determine a common mode signal from the sensor signals, wherein the common mode signal indicates a current focus position of the camera lens with respect to the photosensor; and
      determine a differential mode signal from the sensor signals, wherein the differential mode signal indicates magnitude and direction of tilt of the camera lens with respect to the photosensor.

2. The system as recited in claim 1, wherein the common mode signal is provided as feedback to the actuator.

3. The system as recited in claim 1, wherein the one or more processors are further configured to apply a tilt correction transform to image data captured by the photosensor according to the differential mode signal.

4. The system as recited in claim 1, wherein the one or more processors are further configured to direct the actuator to translate the camera lens on an axis orthogonal to the Z axis according to the differential mode signal to align an image plane of the camera lens with the photosensor.

5. The system as recited in claim 1, wherein the one or more processors are further configured to:
   direct the actuator to translate the camera lens on an axis orthogonal to the Z axis according to the differential mode signal to align an image plane of the camera lens with the photosensor; and
   apply a tilt correction transform to image data captured by the photosensor according to the differential mode signal.

6. The system as recited in claim 1, wherein the two or more magnets include two magnets diametrically attached to opposite sides of the camera lens, and wherein the two or more sensors include two sensors located on a camera substrate below the two magnets and on opposite sides of the photosensor.

7. The system as recited in claim 1, wherein the two or more sensors include two sensors diametrically attached to opposite sides of the camera lens, and wherein the two or more magnets include two magnets located on a camera substrate below the two sensors and on opposite sides of the photosensor.

8. The system as recited in claim 1, wherein the two or more magnets are components of the actuator.

9. The system as recited in claim 1, wherein the sensors are Hall effect sensors.

10. The system as recited in claim 1, wherein the actuator is a voice coil actuator (VCA).

11. A method, comprising:
performing, by one or more processors in a device comprising a camera that includes a photosensor, a camera lens, and an actuator configured to adjust the camera lens with respect to the photosensor:
receiving signals from two or more autofocus position (AP) sensors;
determining a common mode signal from the sensor signals, wherein the common mode signal indicates a current focus position of the camera lens with respect to the photosensor; and
determining a differential mode signal from the sensor signals, wherein the differential mode signal indicates magnitude and direction of tilt of the camera lens with respect to the photosensor.

12. The method as recited in claim 11, further comprising providing the common mode signal as feedback to the actuator.

13. The method as recited in claim 11, further comprising applying a tilt correction transform to image data captured by the photosensor according to the differential mode signal.

14. The method as recited in claim 11, further comprising directing the actuator to translate the camera lens on an axis orthogonal to the Z axis according to the differential mode signal to align an image plane of the camera lens with the photosensor.

15. The method as recited in claim 11, wherein the camera further comprises magnets attached to the camera lens, wherein the AP sensors are located on a camera substrate below the magnets, and wherein the signals generated by the AP sensors indicate distance from respective ones of the magnets.

16. The method as recited in claim 11, wherein the AP sensors are attached to the camera lens, wherein the camera further comprises magnets located on a camera substrate below the AP sensors, and wherein the signals generated by the AP sensors indicate distance from respective ones of the magnets.

17. A device, comprising:
one or more processors;
one or more cameras, wherein at least one of the one or more cameras is a camera comprising:
a photosensor configured to capture light projected onto a surface of the photosensor;
a camera lens configured to refract light from an object field located in front of the camera to form an image of a scene at an image plane at or near the surface of the photosensor;
an actuator configured to adjust the camera lens with respect to the photosensor on one or more axes orthogonal to an optical axis of the camera lens;
two or more magnets; and
two or more autofocus position (AP) sensors, wherein each of the two or more AP sensors is configured to generate a signal indicating distance from a respective one of the two or more magnets;
a memory comprising program instructions executable by at least one of the one or more processors to:
receive signals from two or more autofocus position (AP) sensors;
determine a common mode signal from the sensor signals, wherein the common mode signal indicates a current focus position of the camera lens with respect to the photosensor;
determine a differential mode signal from the sensor signals, wherein the differential mode signal indicates magnitude and direction of tilt of the camera lens with respect to the photosensor;
provide the common mode signal as feedback to the actuator; and
apply a tilt correction transform to image data captured by the photosensor according to the differential mode signal.

18. The device as recited in claim 17, wherein the one or more processors are further configured to direct the actuator to translate the camera lens on an axis orthogonal to the Z axis according to the differential mode signal to align an image plane of the camera lens with the photosensor.

19. The device as recited in claim 17, wherein the two or more magnets include two magnets diametrically attached to opposite sides of the camera lens, and wherein the two or more sensors include two sensors located on a camera substrate below the two magnets and on opposite sides of the photosensor.

20. The device as recited in claim 17, wherein the two or more sensors include two sensors diametrically attached to opposite sides of the camera lens, and wherein the two or more magnets include two magnets located on a camera substrate below the two sensors and on opposite sides of the photosensor.

* * * * *